US009863703B2

(12) United States Patent
Morrison

(10) Patent No.: US 9,863,703 B2
(45) Date of Patent: Jan. 9, 2018

(54) TOWER GRAIN DRYER WITH IMPROVED HEAT RECLAMATION AND COUNTER-FLOW COOLING SECTION

(71) Applicant: The GSI Group, LLC, Assumption, IL (US)

(72) Inventor: David Morrison, Carlinville, IL (US)

(73) Assignee: The GSI Group, LLC, Assumption, IL (US)

( * ) Notice: Subject to any disclaimer, the term of this patent is extended or adjusted under 35 U.S.C. 154(b) by 354 days.

(21) Appl. No.: 14/618,810

(22) Filed: Feb. 10, 2015

(65) Prior Publication Data

US 2015/0241123 A1    Aug. 27, 2015

Related U.S. Application Data

(60) Provisional application No. 61/943,102, filed on Feb. 21, 2014.

(51) Int. Cl.
    *F26B 17/12*    (2006.01)
    *F26B 23/00*    (2006.01)

(52) U.S. Cl.
    CPC ............ *F26B 23/002* (2013.01); *F26B 17/12* (2013.01); *F26B 2200/06* (2013.01); *Y02P 70/405* (2015.11)

(58) Field of Classification Search
    CPC ...... F26B 23/002; F26B 17/12; F26B 17/122; F26B 17/124; F26B 17/126; F26B 17/128; F26B 17/14; F26B 17/1408; F26B 17/1416; F26B 2200/06; Y02P 70/405

USPC ......... 34/169, 165, 168, 174, 175, 176, 179, 34/181, 428, 433, 435, 513, 518, 86
See application file for complete search history.

(56) References Cited

U.S. PATENT DOCUMENTS

| 4,308,669 A * | 1/1982 | Noyes ................... F26B 17/122 34/168 |
| 6,209,223 B1 * | 4/2001 | Dinh .................... F26B 17/1416 34/167 |
| 2009/0094853 A1 * | 4/2009 | Noyes ................... F26B 17/122 34/233 |

* cited by examiner

Primary Examiner — John McCormack

(57) ABSTRACT

A grain drying tower comprises a heater and blower separating a heating plenum and a cooling plenum. The dryer is provided with a heat reclamation/heat recycling system and/or counter-flow cooling to reduce the energy requirements of the tower dryer. The heat reclamation system comprises a chamber external to the outer wall of the tower and which is and located at a point along the drying path. The bottom of the chamber is open to the atmosphere. Hot exhaust air enters the heat reclamation chamber at the top of the chamber and is drawn back into the tower by the blower as the exhaust air exits the open bottom of the chamber. In the counter-flow, the walls defining the grain path of the in the cooling section are not air permeable, and air is drawn into the cooling section through outer wall ducts which are closed at the inner wall. The entering air travels up through heated grain to be warmed, and then enters the plenum through inner wall ducts, which are closed at the outer wall of the tower.

14 Claims, 13 Drawing Sheets

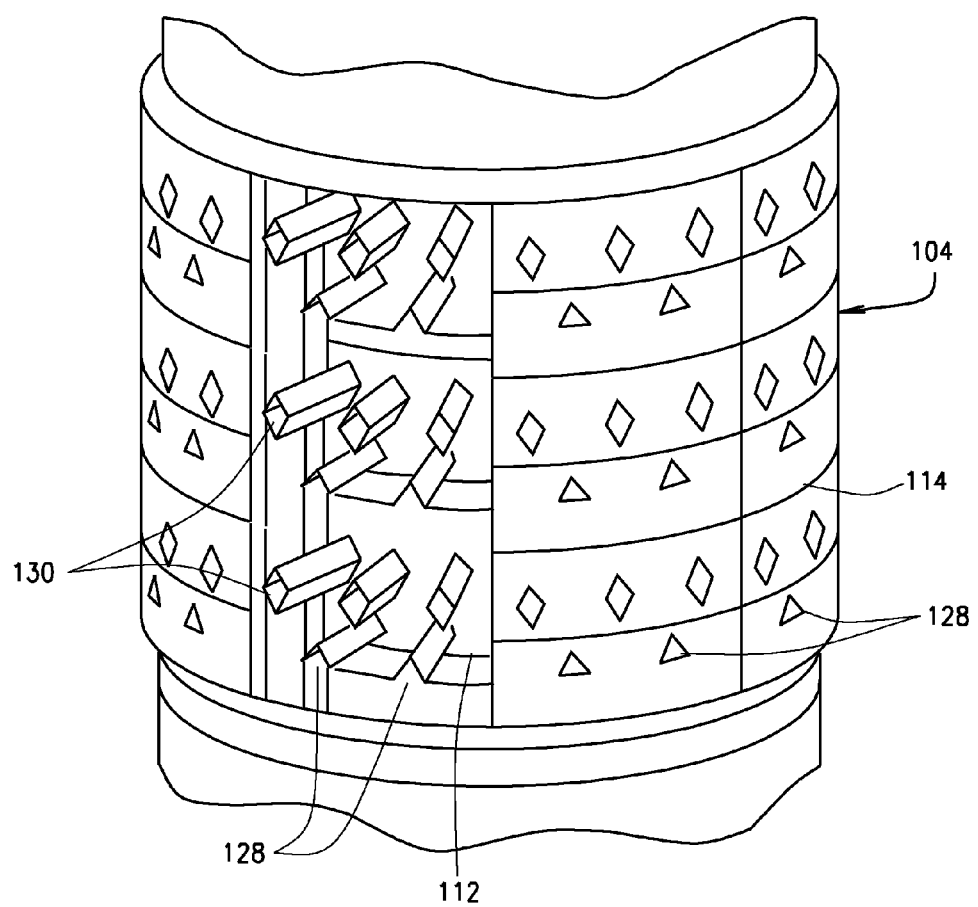
F I G . 5

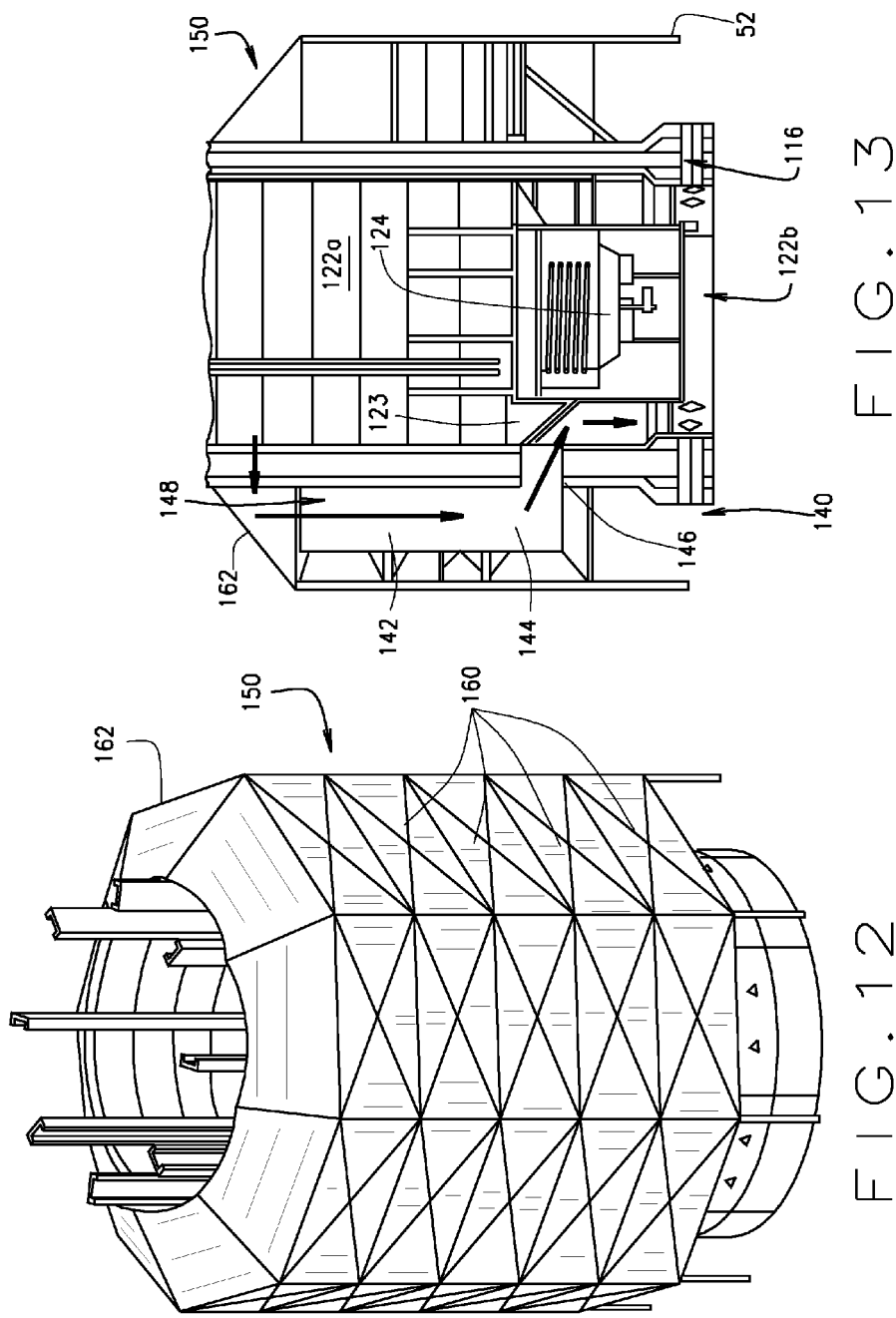

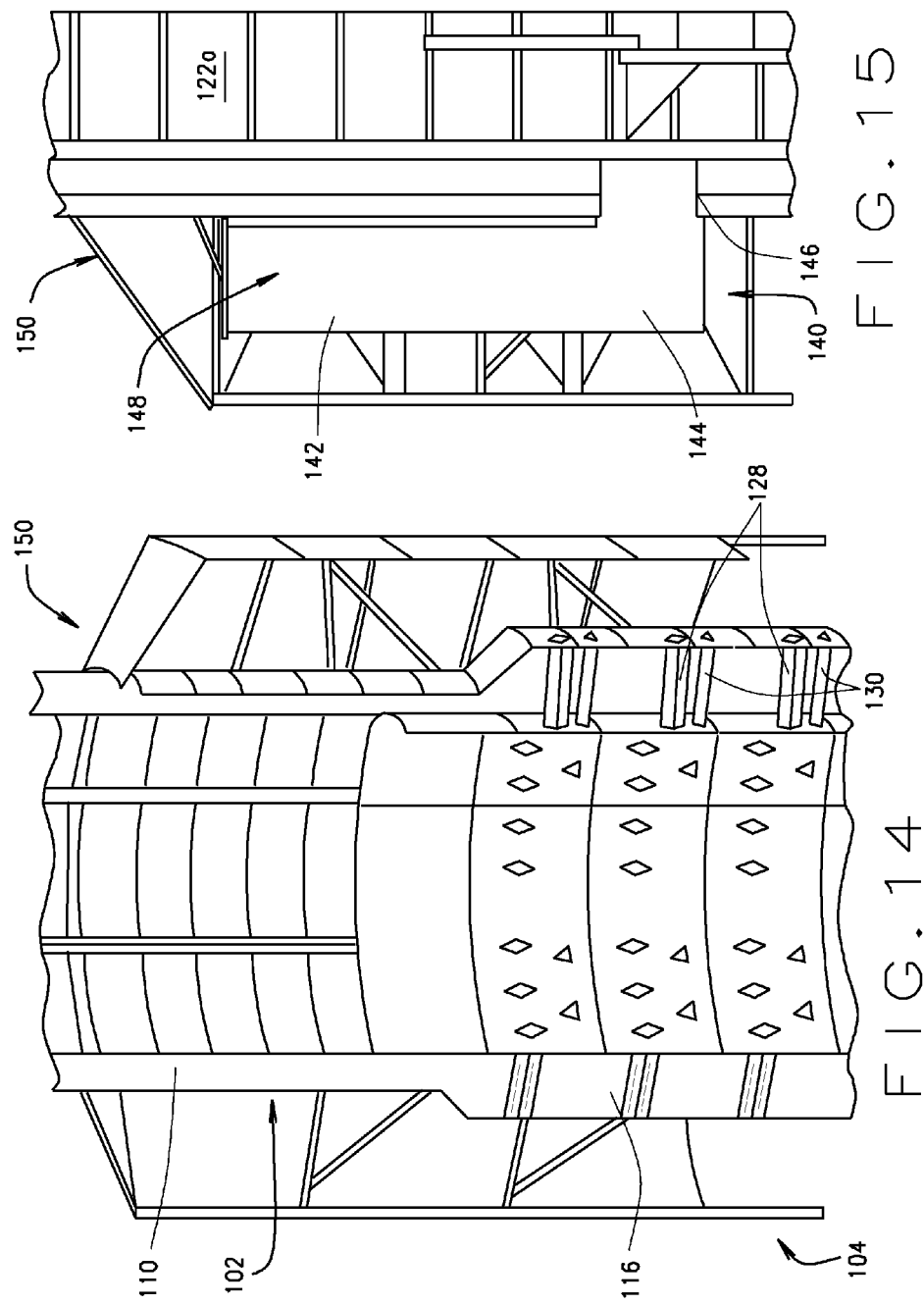

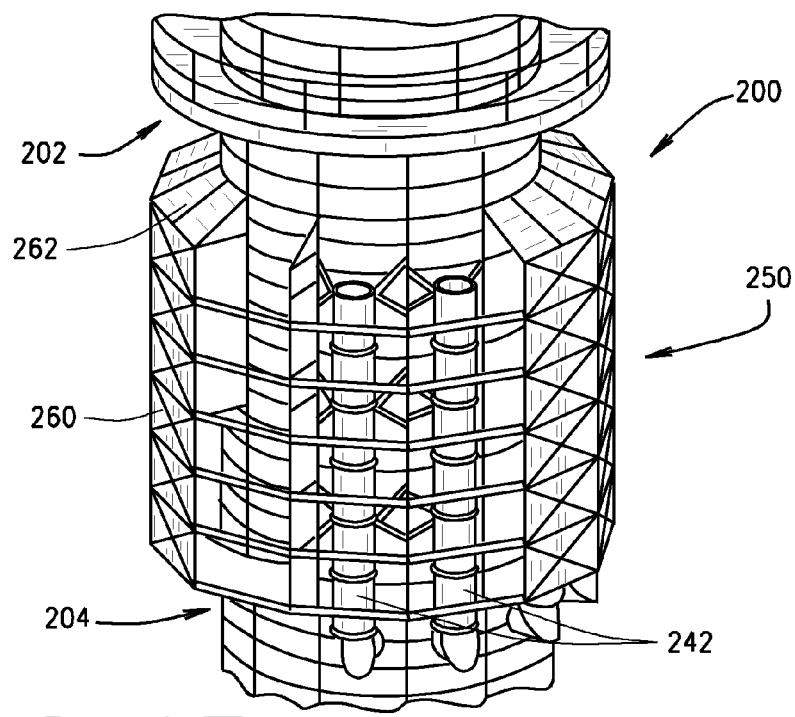
F I G . 17
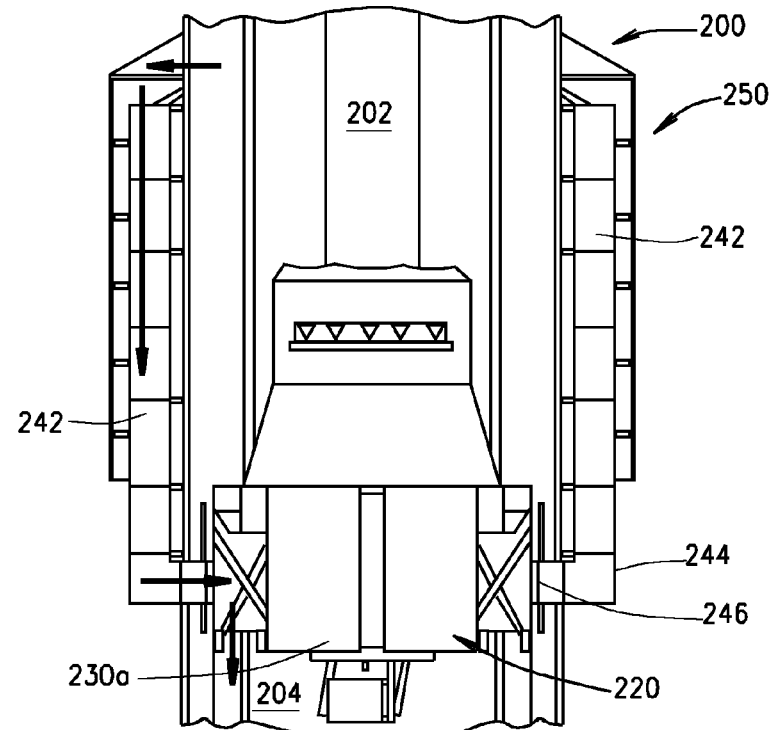
F I G . 18

TOWER GRAIN DRYER WITH IMPROVED HEAT RECLAMATION AND COUNTER-FLOW COOLING SECTION

CROSS-REFERENCE TO RELATED APPLICATIONS

This application claims priority to U.S. App. No. 61/943,102 filed Feb. 21, 2014, which is entitled "Tower Grain Dryer With Improved Heat Reclaim And Counter-Flow Cooling Section," and which is incorporated herein by reference.

STATEMENT REGARDING FEDERALLY SPONSORED RESEARCH OR DEVELOPMENT

Not Applicable.

BACKGROUND OF THE INVENTION

This application relates to tower grain dryers, and, in particular to a tower dryer with a heat reclamation/recovery system and, optionally, a counter-flow cooling section.

Currently available grain tower dryers 10, such as shown schematically in FIG. 1, typically comprise a central plenum 12 defined by a porous (or air pervious) wall 14. The tower also includes an outer porous (or air pervious) wall 16 spaced from the plenum wall 14. The plenum wall and outer wall define an annular column 18 through which grain to be dried flows. A heater/blower 20 is typically positioned within the plenum. The heater/blower draws cool air in through a bottom portion of the grain dryer and across the grain column, as shown by the arrows A1 in FIG. 1, which cools the heated grain and simultaneously preheats the air which cooled the grain prior to entering the heater/blower. The preheated air enters the heater/blower to be heated to the drying temperature and is expelled out through an upper portion of the grain column, as shown by the arrows A2. Hence, the grain falls through an upper heating section (where the grain is dried) into a lower cooling section (where the grain is cooled).

Dryers of the tower type can process anywhere from 1000 bushels per hour to over 10,000 bushels per hour. It can be appreciated that any improvement in drying efficiency can have a significant benefit. In addition dryers of this type, with their very high drying rates and cross-flow cooling/heat reclamation, are often cited as causing some damage to the drying grain due to the rapid cooling of hot grain with very cool air. Thus, improvements to the cooling section can result in improved grain quality as well as improved heat reclamation.

As can be appreciated, in a dryer with a cross-flow of cooling air, such as shown in FIG. 1, the hot dried grain which exits the drying section will encounter air substantially at ambient temperature. This contact of the hot grain with substantially cooler air can cause high moisture corn to crack and break.

Additionally, high moisture grain, such as high moisture corn, will be subjected to more heat during the drying process than is typically required under normal harvest conditions. This can make the grain more susceptible to breakage. Broken corn increases the amount of fine material ("grain fines") in storage vessels and is often more susceptible to mold while in storage. Research has shown that rapid transition from hot to cool can exacerbate breakage potential. Wet harvest conditions can also lead to the presence of other foreign materials with the grain. The Grain Inspection, Packers and Stockyards Administration (GIPSA) of the United States Department of Agriculture (USDA) defines foreign materials as: "All matter that passes readily through a 6/64" round-hole sieve and all matter other than corn that remains on top of the 12/64" round-hole sieve according to procedures prescribed in FGIS instructions." The maximum allowable amount of broken corn and foreign material (BCFM) for No. 2 yellow corn is 3%. Ethanol plants will typically discount for BCFM greater than 3-4%, and corn with levels greater than 6-7% is typically subject to rejection. Facilities that may be handling atypical levels of BCFM will likely need to enhance dust control efforts and pay particular attention to dust-related safety measures. Further, abnormal BCFM can greatly affect fermentation by introducing additional unfermentable materials to the process.

It would thus also be desirable to provide a tower dryer which will reduce BCFM in corn, and reduce damage to grain in general, by providing a more gradual cooling process in the cooling section.

BRIEF SUMMARY OF THE INVENTION

Briefly stated, a grain drying tower comprises a heater and blower separating a heating plenum and a cooling plenum. The blower draws air from the cooling plenum into the heater, where its temperature is raised, and pushes it into the heating plenum. Thus a negative pressure exists in the cooling plenum and a positive pressure exists in the heating plenum. The peripheries of the heating and cooling plenums are surrounded by heating and cooling columns, respectively. The heating and cooling columns are defined by inner and outer walls, which are preferably cylindrical, and with the outer wall surrounding the inner wall (i.e., the inner and outer walls are generally coaxial, such that the heating and cooling columns are annular). The inner and outer walls of the heating column are both made from a porous (or air-permeable) material, whereas the inner and outer walls of the cooling column are made from a material which is not porous (i.e., an air impermeable material). The inner and outer walls of the heating and cooling plenum, in combination, define an annular grain drying path. The tower includes an inlet at the top of the tower which directs grain to the grain drying path. The grain passes along the drying path, to exit the tower at an outlet at the bottom of the tower. The inner and outer walls of the heating plenum are perforated (or otherwise air-permeable), as noted, so that heated air can pass through the drying path to dry the grain as it falls along the drying path. At a point approximately halfway down the drying path, the grain passes through grain turners which may be of the type in U.S. Pat. No. 8,601,714, which is incorporated herein by reference, in order to provide optimal use of the drying air.

The dryer can include a heat reclamation or heat recycling system. The heat reclamation system comprises a chamber external to the outer wall and located at a point along the drying path and below the grain turners. The heat reclamation chamber is defined on one side by the outer wall of the heating section and on two sides by a shroud or enclosure, with the bottom of the chamber being preferably open to the atmosphere. A plurality of heat recycling ducts or tubes extend from the cooling plenum, through the cooling column, and into the upper portion of this heat reclamation chamber. The location of the heat reclamation chamber, the position of the duct opening, and the negative pressure of the cooling plenum act in combination to pull a portion of the relatively dry and warm exhaust air from a region below the grain turners directly into the cooling plenum.

As grain passes from the drying path, it enters the cooling path. The cooling path is defined by an outer wall and, spaced apart from it, an inner wall. Further, the inner and outer walls are illustratively shown to be cylindrical, such that the cooling path is annular. The inner wall also defines the cooling plenum and the cooling plenum is separated from the heating plenum by a plenum divider or preferably by a divider hopper.

The tower dryer can be provided with a counter-flow in the cooling section which forces air to travel up through the downward flowing grain. In the counter-flow section, both the inner and outer walls of the cooling path are made from an air impermeable or non-porous material. A plurality of openings are formed in the cooling section outer wall which lead to open bottom outer wall ducts which extend from the outer wall into the grain path. The outer wall ducts illustratively extend to, and terminate at, the inner wall. However, the outer wall ducts do not open into the inner wall, and thus are closed at the inner wall. Similarly the inner wall includes a plurality of openings and corresponding inner wall ducts extending into the grain path from the inner wall openings. The inner wall ducts illustratively extend to, and terminate at the outer wall, and are thus closed at the outer wall. The ducts are shaped to permit the flow of grain over and under the ducts with minimal obstruction and without spillage. Thus, the top half of the ducts define an angle equal to or greater than the angle of repose of the grain flowing through the column. If the duct has a fully open bottom, the bottom edge of the duct opening in the relevant wall will need to define an angle equal to or less than the angle of repose of the grain flowing through the column. The open bottom of these ducts may be fully open (i.e., no bottom wall) or may be partially open by means of louvers or perforations. The blower of the grain dryer generates a negative pressure in the cooling plenum and, in combination with the wall openings and ducts, draws ambient cooling air into the outer wall ducts, through the grain, counter to the direction of the grain flow (rather than across the grain path), and out of the grain through the inner wall ducts to the cooling plenum. The inner wall ducts define a plurality of columns and rows, and thus form a grid of inner wall ducts. Similarly, the outer wall ducts define a plurality of columns and rows, and form a grid of outer wall ducts. The inner wall ducts and outer wall ducts are off-set from each other so as to bias the flow of air counter to the flow of the grain, rather than with the grain flow.

BRIEF DESCRIPTION OF THE SEVERAL VIEWS OF THE DRAWINGS

FIG. 5 is an enlarged, perspective view of the cooling section of the tower dryer, with a portion of the outer wall removed, to show the outer wall ducts and the inner wall ducts of the tower dryer;

FIG. 12 is a perspective fragmentary view of the heat reclamation/heat recovery section of the tower dryer;

FIG. 13 is a vertical cross-sectional view of the heat recovery section of the tower dryer with arrows showing the exhaust air reclamation path;

FIG. 14 is a vertical cross-section view through the recovery section of the tower dryer;

FIG. 15 is an enlarged fragmentary cross-sectional view showing a single exhaust air heat reclamation path.

FIG. 17 is an enlarged cut-away view of the heat reclamation system of the tower of FIG. 16A; and FIG. 18 is a vertical cross-sectional view of the heat reclamation system.

Corresponding reference numerals will be used throughout the several figures of the drawings.

DETAILED DESCRIPTION OF THE INVENTION

Figure 1:
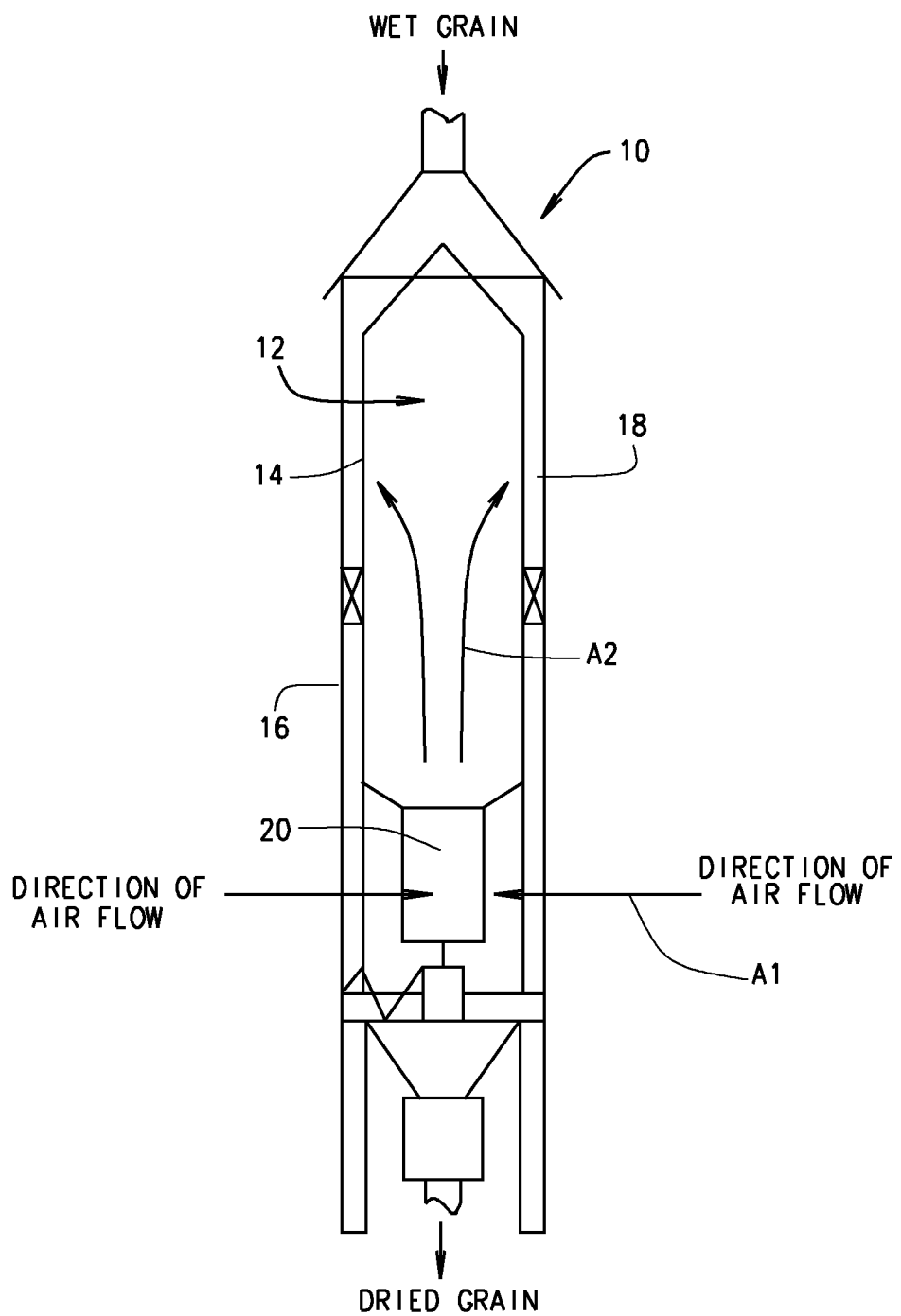
FIG. 1 is a schematic drawing of a prior art tower dryer that has cross-flow cooling.

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Figures 2, 3:
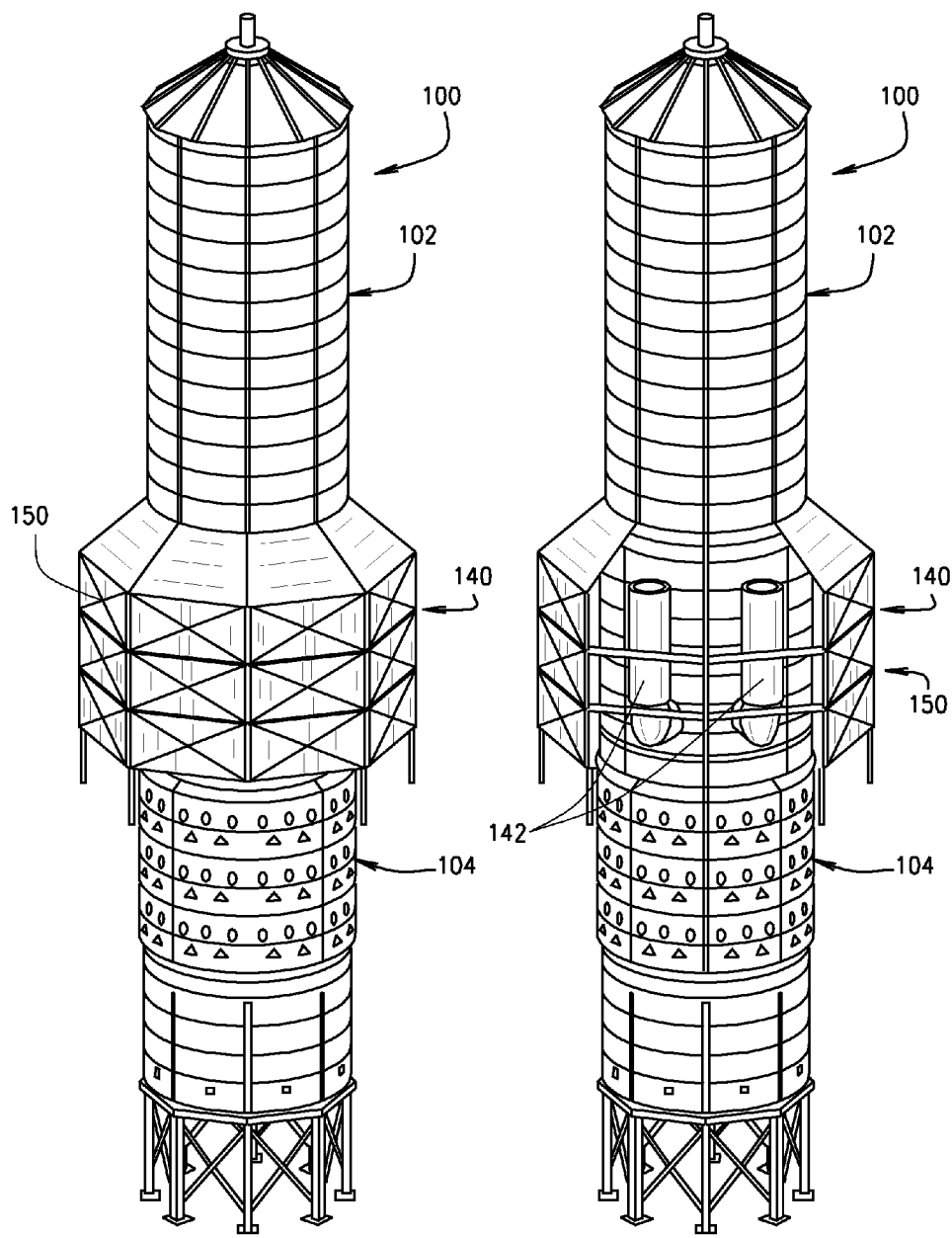
FIG. 2 is a perspective view of a tower dryer having both counter-flow cooling and a heat reclamation/recovery system.
FIG. 3 is a perspective view similar to that of FIG. 2, but with a portion of an enclosure of the heat recovery system removed to show heat recovery tubes of the heat recovery system.
Figure 4:
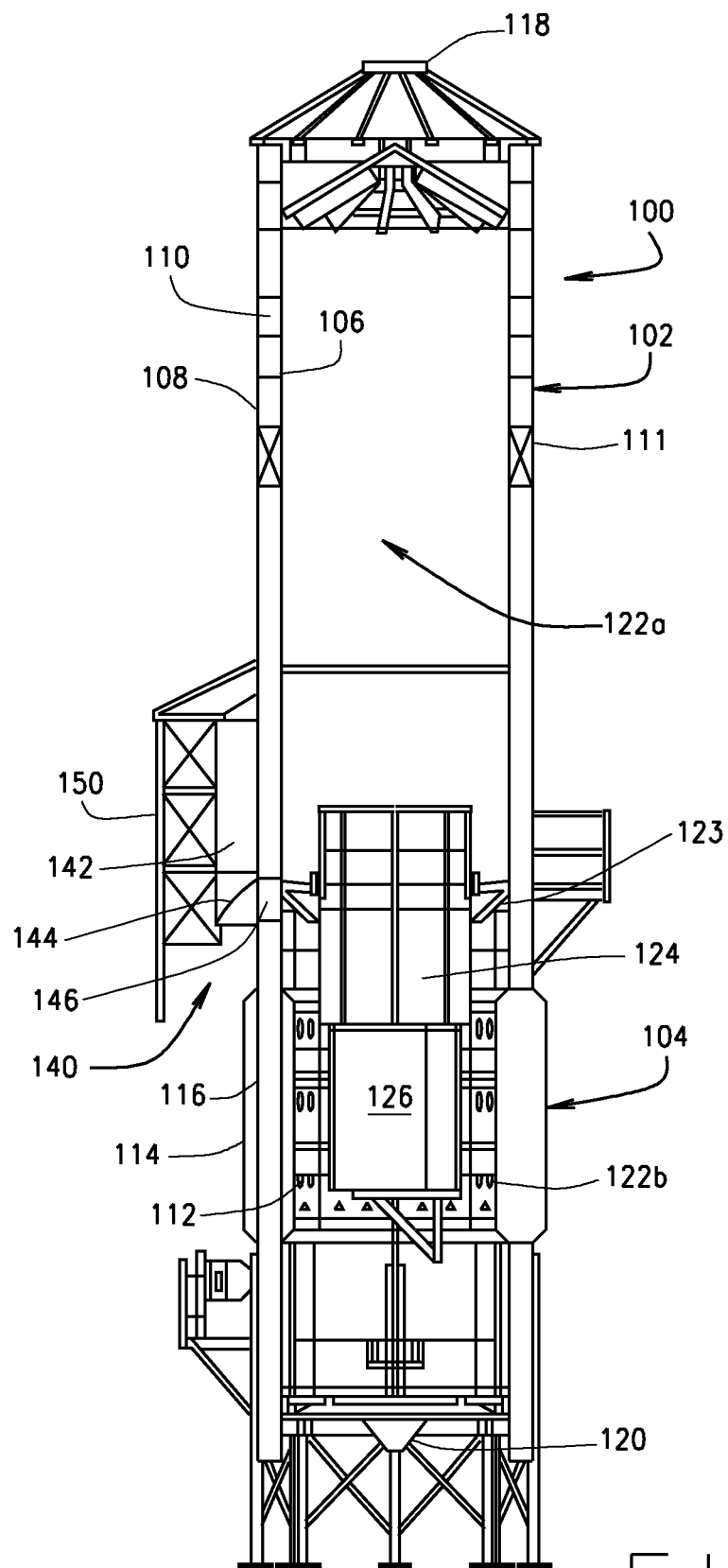
FIG. 4 is a cross-sectional view of the tower dryer with the heat reclaim chamber illustratively shown on one side only.
Figure 6:
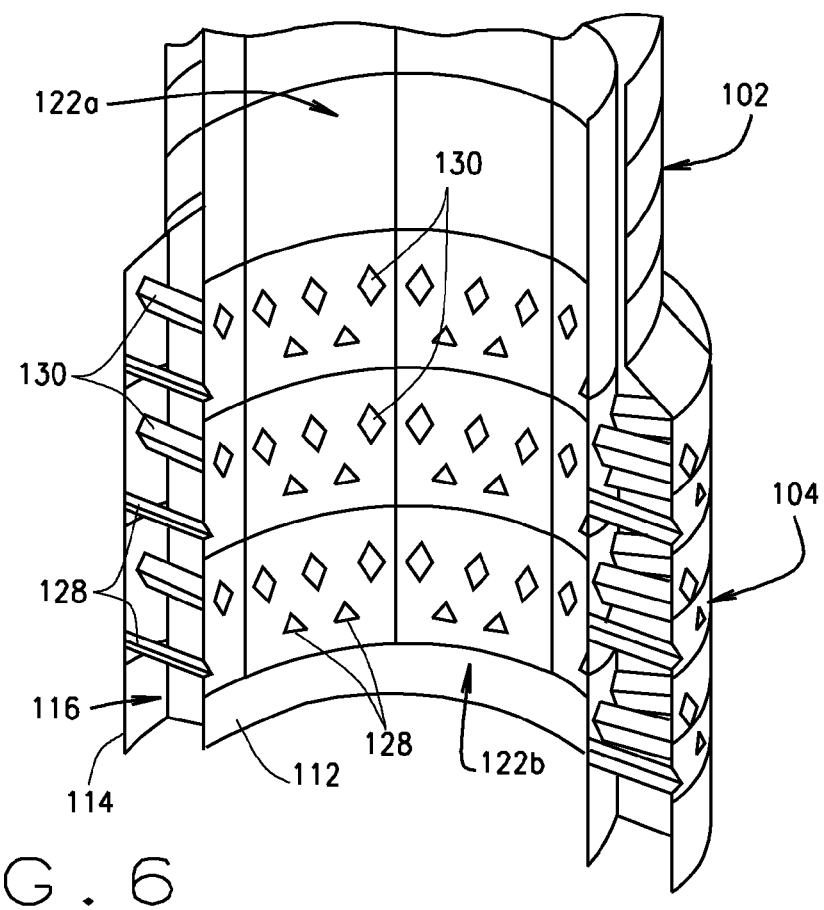
FIG. 6 is an enlarged fragmentary perspective, cross-sectional view taken along a vertical plane of the drying tower showing the outer wall ducts and inner wall ducts.
Figure 7:
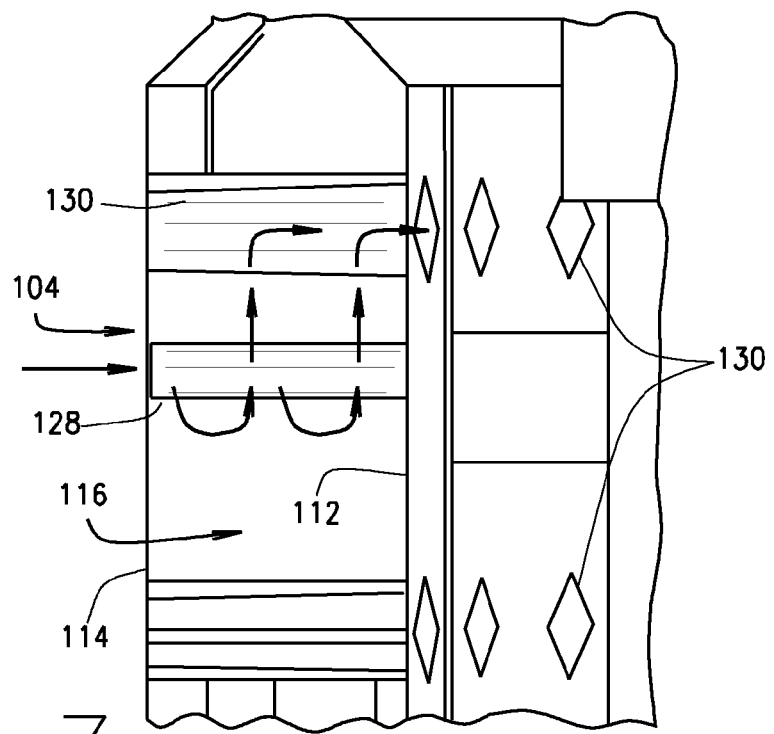
FIGS. 7 and 8 are enlarged, fragmentary perspective views showing the flow of cooling air into the cooling column though the outer wall ducts, and then into the cooling central plenum of the tower through the inner wall ducts.
Figure 8:
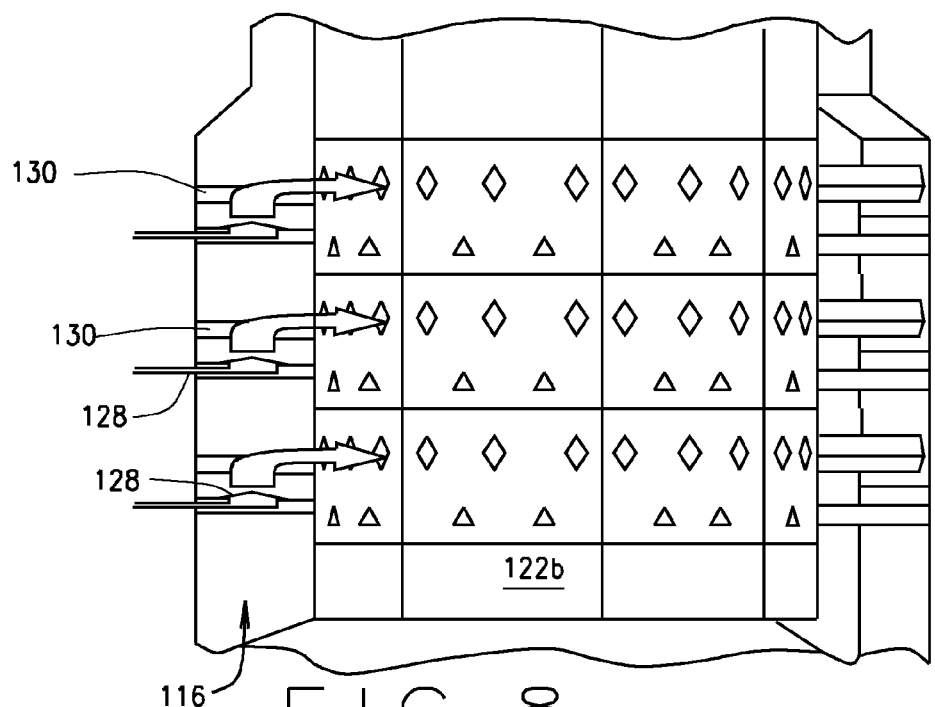
Figure 9:
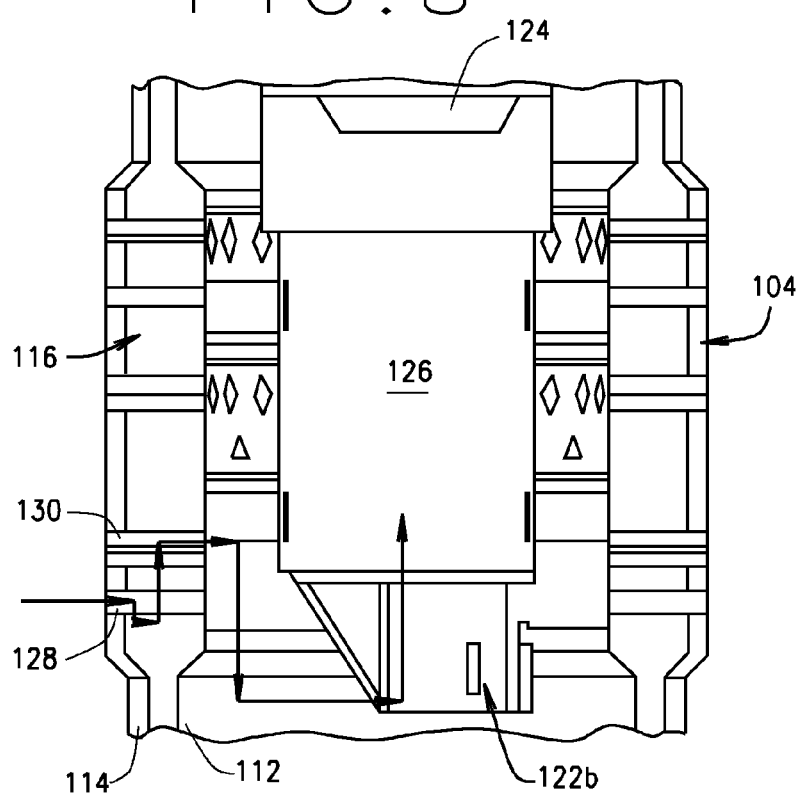
FIG. 9 is a fragmentary cross-sectional view taken along a vertical plane in the cooling section of the tower with an arrow showing the flow of cooling air into and through the grain cooling column, into the central plenum, and then into the blower.

A towering dryer 100 with improved heating and drying capabilities is shown generally in FIGS. 2-4. The tower dryer 100 is divided into an upper drying section 102 and a lower cooling section 104. The upper drying section includes a porous inner wall 106 surrounded by a porous outer wall 108, which in combination define a drying column 110. (FIG. 4) A turner 111 can be located approximately midway along the length of the drying section 102. The turner in the dryer 100 can be a turner such as disclosed in U.S. Pat. No. 8,601,714, which is incorporated herein by reference. The cooling section 104 similarly includes an inner wall 112 surrounded by an outer wall 114, which in combination define a cooling column 116. However, as discussed below, in this dryer, the walls of the cooling column are made from a solid or air impervious material. The drying column and cooling column are in communication such that grain flows from the drying column into the cooling column. The drying and cooling columns, thus in combination, define a grain flow path. The inner and outer walls of the drying column and the cooling column are both illustratively shown to be cylindrical, such that the drying and cooling columns are both annular. An inlet 118 at the top of the tower 100 directs most grain to the grain flow path for drying, and dried cooled grain exits the tower through an outlet 120 at the bottom of the tower.

The inner walls of the drying and cooling sections define a central drying plenum 122a and a central cooling plenum 122b, which are divided by a plenum divider 123 or a divider hopper (FIG. 13). For example, a divider hopper, such as disclosed in U.S. Pat. No. 8,356,420, which is incorporated herein by reference, can be used. A burner 124 is positioned at the approximate juncture of the drying and cooling sections, and a blower 126 is positioned below the burner to direct air through the burner to be heated. The blower creates a negative pressure in the central cooling plenum 122b, and draws air in through the cooling column 116. This cooling air passes through the grain flowing from the drying column 110 to cool the grain. The cooling air, once drawn into the central cooling plenum 122b below the blower, is forced up through the burner where the air is heated. This heated air is then forced through the inner wall 106 of the drying section to dry the moist grain in the drying column 110, and then the heated drying air is exhausted through the outer wall 108 of the drying section.

In commonly available tower dryers, such as the tower dryer 10 of FIG. 1, inner and outer walls of the cooling section are air permeable, and cooling air is pulled in through the dried corn. This air flows across (i.e., generally perpendicular to) the flow of the grain, and is hence termed cross-flow cooling. Thus, cold (or ambient air) will contact the hot grain that exits the dryer column. As noted above, this sudden contact with air that is substantially cooler than the grain (especially at the top of the cooling column) can damage the grain. The tower dryer 100 substantially reduces this problem. Cooling air, which is then heated by the burner to dry grain, is still brought in through the cooling section 104. However, as shown in FIGS. 5-9, the cooling section 104 is provided with a plurality of outer wall ducts 128 and a plurality of inner wall ducts 130. The outer wall ducts 128 are open at the outer wall 114 and extend into the cooling column 116. The outer wall ducts 128 illustratively extend fully across the cooling column and are closed at the cooling section inner wall 112. The inner wall ducts 130 are open at the inner wall 112 (to open into the cooling central plenum 122b) and extend into the cooling column 116. The inner wall ducts 130 illustratively extend fully across the cooling column and are closed at the cooling section outer wall 114.

The outer wall ducts 128 and inner wall ducts 130 are all at least partially open at their bottoms. As seen in the Figures, the outer wall ducts 128 are in the shape of an upside down "V" (i.e., they are Λ-shaped), and thus do not have a bottom wall. The inner wall ducts 130 are illustratively shown to be diamond shaped (i.e., they are ◇-shaped). The bottom walls of the inner wall ducts 130 are perforated, so that air can enter the inner wall ducts from below the inner wall ducts.

The outer wall ducts 128 are preferably vertically and horizontally aligned, to form a grid of outer wall ducts. The inner wall ducts 130 are also vertically and horizontally aligned, to form a grid of inner wall ducts. However, the rows and columns of the inner wall ducts and the outer wall ducts are offset from each other, such that the inner wall ducts 128 and outer wall ducts 130 are neither horizontally nor vertically aligned. Thus, the columns of inner wall ducts are between the columns of outer wall ducts, and the rows of inner wall ducts are between the rows of outer wall ducts. Further, each inner wall duct 130 is above at least one outer wall duct 128 to receive cooling air from the outer wall duct, as described below. The outer wall ducts 128 could be provided with a bottom wall which would define an opening or a path of communication between the outer wall duct and the cooling column 116. In one variation, the extent to which the opening defined by such a bottom wall is open could be controlled to help control the flow of air through the grain in the cooling section. Similarly, the inner wall ducts 130 could be shaped as an inverted V, similar to the shape of the outer wall ducts. The sloped top surfaces of the inner and outer wall ducts will allow grain to flow over the ducts, without collecting grain, as would happen, for example, if the ducts had horizontal upper surfaces (i.e., if they were generally rectangular). Although shown to be triangularly shaped or diamond shaped, the inner and outer ducts could have other shapes. For example, the ducts could define an arc, and thus be generally circular or oval in cross-section.

In operation, the blower creates a negative pressure in the central cooling plenum 122b below the blower 126 (in the cooling section of the tower). Thus, as shown by the arrows in FIGS. 7-9, the negative pressure in the cooling central plenum 122b generated by the blower draws outside air into the cooling column 116 through the outer wall ducts 128. The outer wall ducts 128 do not open into the cooling central plenum 122b, but rather are closed at the end opposite the inlet to the duct 128 in the outer wall 114. Thus, the air entering the outer wall duct 128 exits the duct 128 from the open bottom of the duct. Because the inner wall ducts are vertically and horizontally offset and properly spaced from the outer wall ducts, the air exiting the outer wall ducts 128 is drawn upwardly through the downward flowing dried grain (to cool the grain) until the air enters an inner wall duct 130 through the bottom of the inner wall duct. At that point, the air is pulled through the inner wall duct 130 and into the central cooling plenum 122b by the negative pressure in the central cooling plenum. The air is then pulled up by the blower to be forced through the burner to be heated. The heated air is then urged through the porous (or air-permeable) walls 106 and 108 of the drying section 102 to flow across the grain path in the drying column to dry the moist grain.

As seen, in the cooling column 116, the cooling air flows against (opposite or counter to) the flow of the grain. That is, the cooling air flows generally upwardly through the grain (i.e., rises through the downward flowing grain). This allows for the cool air to remain in the grain column for a longer period of time, and provides for a longer contact of the cooling air with the grain. This has two benefits. First, because the air is in contact with the grain for a longer period of time, the temperature of the air entering the central plenum 122 is warmer than the air entering the central plenum in a prior art tower dryer with cross-flow cooling, such as the tower dryer 10 (FIG. 1). This reduces the amount of energy required by the tower 100 (relative to the tower 10) to heat the air to a desired temperature as the air passes through the burner. Additionally, the warmest grain (i.e., the grain at the top of the cooling column 116) is not subject to the coldest air. Rather, the air warms rises through the column of cooling grain, and the grain entering the cooling column 116 from the drying column 110 contacts air that is warmer than the ambient air. The decrease in the differential between the cooling air temperature and the grain temperature at the top of the column of cooling grain (i.e., at the top of the cooling column 116) increases the quality of the treated grain (the decreased temperature differential is less likely to cause breaking, cracking or other damage to the grain).

Figure 10A:
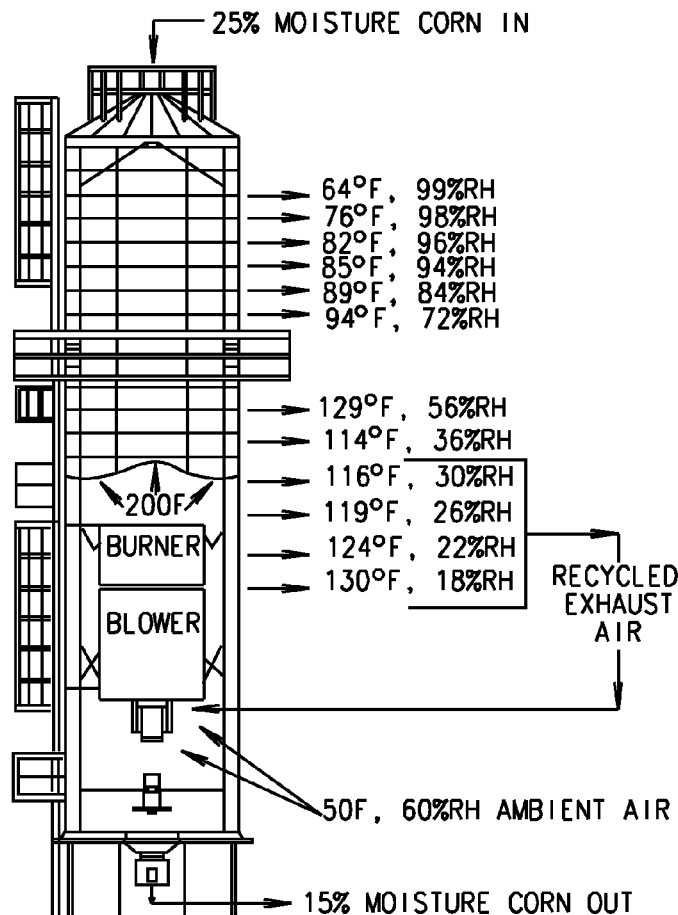
FIG. 10A is a schematic of the tower showing illustrative temperatures and relative humidities of air exhausted from the drying section of a prior art tower having cross-flow cooling.
Figure 10B:
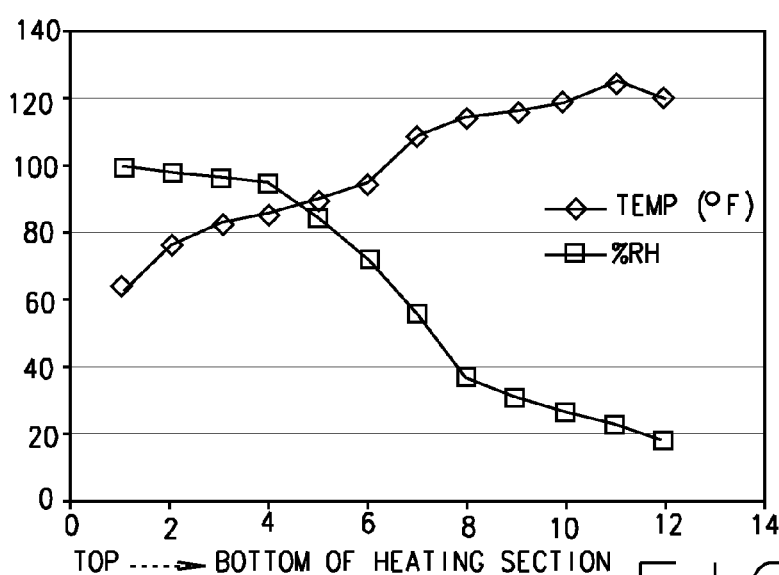
FIG. 10B is a graph charting the illustrative temperature and relative humidity of the exhaust air exiting the drying column from the top to the bottom of the drying section of the tower dryer.
Figure 11:
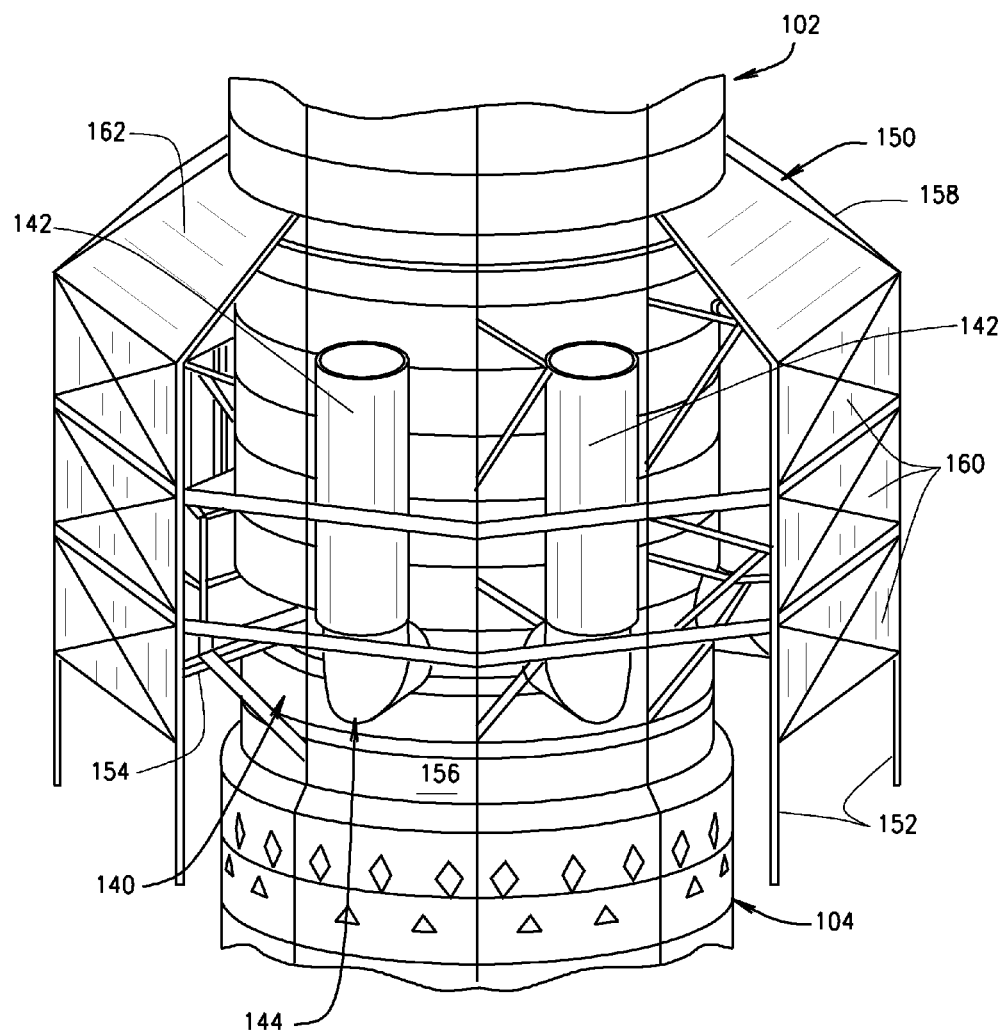
FIG. 11 is an enlarged perspective fragmentary view of the tower dryer with a portion of the heat recovery enclosure removed to show the entrance tubes to the exhaust air reclamation path.

FIG. 10A is a schematic of the tower showing illustrative temperatures and relative humidities of air exhausted from the drying section of the tower. FIG. 10B is a graph charting the temperature and relative humidity of the exhaust air from the top to the bottom of the drying column. The temperature and relative humidity of the exhaust air was calculated based on ambient air at 50° F. (10° C.) and 60% RH, heating the cooling air with the burner to 200° F. (~93° C.), the corn entering the tower having a 25% moisture content, and the corn exiting the tower dryer having a 15% moisture content. The air exiting the drying section at the top of the tower is shown to be 64° F. (~18° C.) and 99% relative humidity. The temperature of the exhaust air increases and the relative humidity of the exhaust air decreases as the grain travels down the drying column 110. At the bottom of the drying section, the exhaust air is illustratively shown to be 130° F. (~54° C.) and 18% relative humidity. The temperatures and relative humidities shown in FIGS. 10A-B will vary based on factors such as the temperature to which the air is heated by the burner, the temperature and moisture content of the grain in the drying column 110, the annular width of the drying column, and the height and diameter of the drying section of the tower. Thus, it will be appreciated that these numbers can change if any of the noted parameters change, and are thus set forth for illustrative purposes only.

The exhaust air exiting the upper portion of the drying section is too cool and too moist to be used. However, the exhaust air in the lower portion of the drying column (at a point generally below the turner 111) is warm enough and dry enough to be recycled and reused to dry the grain. Thus, the tower 100 of FIG. 4 includes a heat recycling/reclamation system 140 (FIGS. 11-15) to capture some of the exhaust air and reintroducing the exhaust air back into the central plenum to be reheated by the burner. The exhaust air that is recirculated or recycled or reclaimed can have a relative humidity of less than about 35% and preferably a relative humidity of about 30% or less.

The heat reclamation system 140 is preferably positioned below the grain turner 111 in the drying section 102. As shown, the heat reclamation system is essentially at the junction of the drying section 102 and the cooling section 104. The heat reclamation system comprises a plurality of upwardly opening vertical tubes 142 positioned around the periphery of the drying section 102. As shown in FIGS. 13 and 15, an inwardly directed elbow 144 is positioned at the bottom of each tube 142, and a transverse tube 146 extends through the top of the cooling section outer wall 114 and opens through the cooling section inner wall 112 proximate blower/heater assembly. The vertical tube 142, elbow 144 and transverse tube 146 define an exhaust air reclamation path 148. As shown in FIG. 13, the outlet from the reclamation path 148 to the central cooling plenum 122b at the top of the cooling section 104 is above the inlet to the blower. However, the reclamation path outlet could be below the blower inlet if desired. The reclamation paths 148 are spaced evenly about the bottom of the dryer section. The tower 100 is shown to have eight (8) reclamation paths 148. More or fewer exhaust air reclamation paths could be provided as desired.

The vertical air reclamation tubes 142 are surrounded by an enclosure or shroud 150. The enclosure 150 comprises vertical frame members 152 spacers 154 which space the vertical frame members from the tower outer wall, horizontal frame members 156, and upper frame members 158 which slope diagonally upwardly from the upper end of the vertical frame members toward the outer wall of the heating section. Side panels 160 are mounted between the vertical frame members and top panels 162 are mounted between the upper frame members, and extend from the top of the side panels and reach to the drying section outer wall. The enclosure 150 is thus closed at its top and side, and opened at its bottom.

As shown by the arrows in FIG. 13, warm, relatively dry air is exhausted through the grain drying column 110 and out the drying section outer wall into the area enclosed by the enclosure 150. The side panels 160 and top panels 162 are all spaced from the vertical tubes 142. There is thus a gap between the open top of the vertical tubes 142 and the top panels 162. The enclosure 150, as can be appreciated, contains or constrains exhaust air, and a portion of this is drawn into the tubes 142, and hence, into the reclamation path 148. The angled top panels 162 may also serve to deflect exhaust air into the vertical tubes 142. However, more importantly, the enclosure serves to prevent air, moisture, snow, etc. from above the enclosure 150 from being drawn into the exhaust air reclamation path 148.

The exhaust air which enters the reclamation path 148 is directed into the central plenum in the cooling section of the tower in the vicinity of the blower/heater assembly. The reclaimed air is then joined with the cooling air which entered the central plenum through the outer wall ducts and inner wall ducts to be forced into the burner by the blower. The enclosure 150 serves at least the following function. It captures the exhaust air which is to be reclaimed or recycled. To a small degree, it deflects air into the reclamation path 148. However, because the reclamation path is in communication with the central plenum in the cooling section, the negative pressure produced by the blower in the cooling section will draw the air into the vertical tube of the reclamation path. The enclosure 150 also separates the heat reclamation area from external air, and thus, the moist cool air that exits the dryer section above the reclamation system 140 will not mix with exhaust air that is warmer and dryer, and thus will remain useable for further drying of the grain.

Additionally, as noted, the enclosure 150 is opened at its bottom. Thus, the exhaust air which is not pulled into the vertical tubes 142 will exit the enclosure 150 at the bottom of the enclosure. The air exiting the enclosure will be in the vicinity of the outer wall ducts, as seen in FIG. 14. In fact, as seen in FIG. 14, the enclosure surrounds at least some of the upper outer wall ducts. The air exiting the enclosure 150 will still be warmer than the ambient air. Because the bottom of the enclosure is in proximity to at least some of the upper outer wall ducts, some of the exhaust air which does not enter the exhaust air reclamation path 148 may be reclaimed through the outer wall ducts. Or, as described below, in the case of a dryer without the ducts in the cooling section, the warmer-than-ambient air may be drawn through the perforated walls of the cooling section. The reclamation of exhaust air through the ducts 124, 126 provides warmer-than-ambient air for cooling the grain at the top of the cooling column. The intake of warmer air at the top of the cooling column reduces the temperature differential between the hot dried corn and the cooling air, and thus leads to an additional reduction in heat damage to the grain.

The reclaimed exhaust air that is recycled into the cooling section central plenum 122b is warmer than the cooling air that enters the central plenum through the inner wall ducts. Thus, the reclaimed or recycled exhaust air further preheats the air that is forced through the burner by the blower. Further, the exhaust air that is pulled back in through the outer and inner wall ducts will also preheat the air entering the cooling section plenum 116. This thus further reduces the amount of energy necessary to heat the air to a desired temperature (such as 200° F. (~93° C.)).

There are instances in which it may be desirable to provide a tower dryer with only the heat recovery. Such a tower dryer would essentially provide a tower dryer having cross-flow cooling (such as the tower of FIG. 1) with a heat reclamation system. For example, it is less expensive to construct a tower dryer with cross-flow cooling than with counter-flow cooling. Additionally, currently existing cross-flow cooling tower dryers can be retrofitted with a heat reclamation system.

Figure 16A:
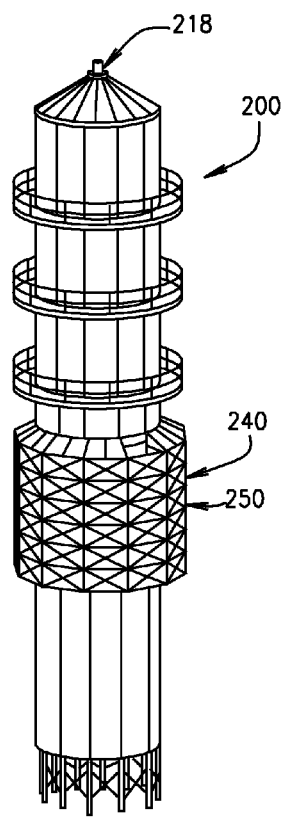
FIGS. 16A-C are side elevational, partial cut-away, and vertical cross-sectional views of a tower dryer with the heat reclamation system, but without the counter-flow cooling.
Figure 16B:
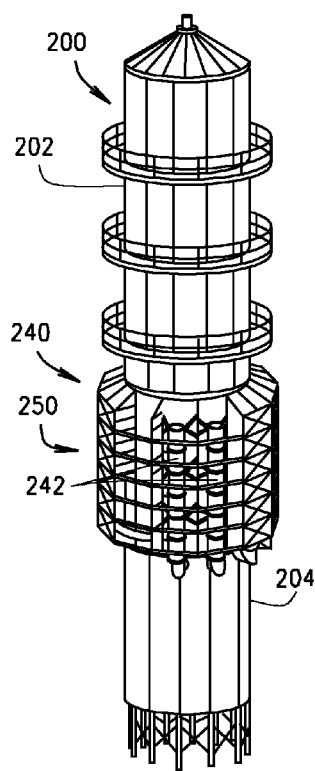
Figure 16C:
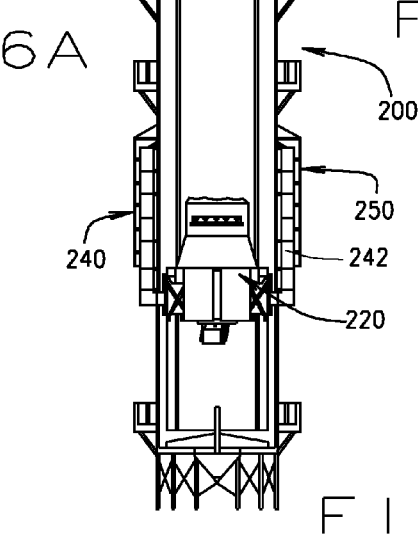

The tower dryer 200 shown in FIGS. 16A-17 is a cross-flow tower dryer provided with a heat reclamation system. The tower dryer 200 is divided into an upper drying section 202 and a lower cooling section 204. The both the upper drying section and lower cooling section include a porous inner wall 206 surrounded by a porous outer wall 208, which in combination define a grain column 210. A turner (not shown) can be located approximately midway along the length of the drying section 202. The grain column 210 in the drying section 202 (i.e., the drying column) and grain column 210 in the cooling section (i.e., the cooling column) are in communication such that grain flows from the drying column into the cooling column. The drying and cooling columns, thus in combination, define a grain flow path. The inner and outer walls of the drying column and the cooling column are both illustratively shown to be cylindrical, such that the drying and cooling columns are both annular. An inlet 218 at the top of the tower 200 directs most grain to the grain flow path for drying, and dried cooled grain exits the tower through an outlet 120 at the bottom of the tower.

The heat reclamation or heat recovery system 240 of the tower 200 is substantially identical to the heat reclamation system 140 of the tower 100. To this end, the heat reclamation system 240 is preferably positioned below the grain turner in the drying section 202, and is positioned essentially at the junction of the drying section 202 and the cooling section 204. The heat reclamation system comprises a plurality of upwardly opening vertical tubes 242 positioned around the periphery of the drying section 202. An inwardly directed elbow 244 is positioned at the bottom of each tube 242, and a transverse tube 246 extends through the top of the cooling section outer wall 204 and opens through the cooling section inner wall 112 proximate blower/heater assembly 220. The vertical tube 242, elbow 244 and transverse tube 246 define an exhaust air reclamation path 248.

The outlet from the reclamation path 248 to the central cooling plenum at the top of the cooling section 204 is above the inlet to the blower 220a. However, the reclamation path outlet could be below the blower inlet if desired. A plurality of reclamation paths 248 are spaced evenly about the bottom of the dryer section. The tower 200 could be provided with eight reclamation paths 248, as was the tower 100. However, more or fewer reclamation paths could be used.

The vertical air reclamation tubes 242 are surrounded by an enclosure or shroud 250, which is identical to the shroud 150. The shroud 250 will not be further described expect to state that it has a side wall formed from side panels 260 and in upper surface formed form top panels 262. The upper surface is shown to slope outwardly and downwardly. The enclosure 250 is thus closed at its top and side, and opened at its bottom.

As shown by the arrows in FIG. 18, warm, relatively dry air is exhausted through the grain drying column 210 and out the drying section outer wall into the area enclosed by the enclosure 250. The side panels 260 and top panels 262 are all spaced from the vertical tubes 242. There is thus a gap between the open top of the vertical tubes 242 and the top panels 262. The enclosure 250, as can be appreciated, contains or constrains exhaust air, and a portion of this is drawn into the tubes 242, and hence, into the reclamation path 248. The angled top panels 262 may also serve to deflect exhaust air into the vertical tubes 242. However, more importantly, the enclosure serves to prevent air, moisture, snow, etc. from above the enclosure 250 from being drawn into the exhaust air reclamation path 248.

The exhaust air which enters the reclamation path 248 is directed into the central plenum in the cooling section of the tower in the vicinity of the blower/heater assembly. The reclaimed air is then joined with the cooling air which entered the central plenum through the outer wall ducts and inner wall ducts to be forced into the burner by the blower. The enclosure 250 serves at least the following function. It captures the exhaust air which is to be reclaimed or recycled. To a small degree, it deflects air into the reclamation path 248. However, because the reclamation path is in communication with the central plenum in the cooling section, the negative pressure produced by the blower in the cooling section will draw the air into the vertical tube of the reclamation path. The enclosure 250 also separates the heat reclamation area from external air, and thus, the moist cool air that exits the dryer section above the reclamation system 240 will not mix with exhaust air that is warmer and dryer, and thus will remain useable for further drying of the grain.

Figure 19:
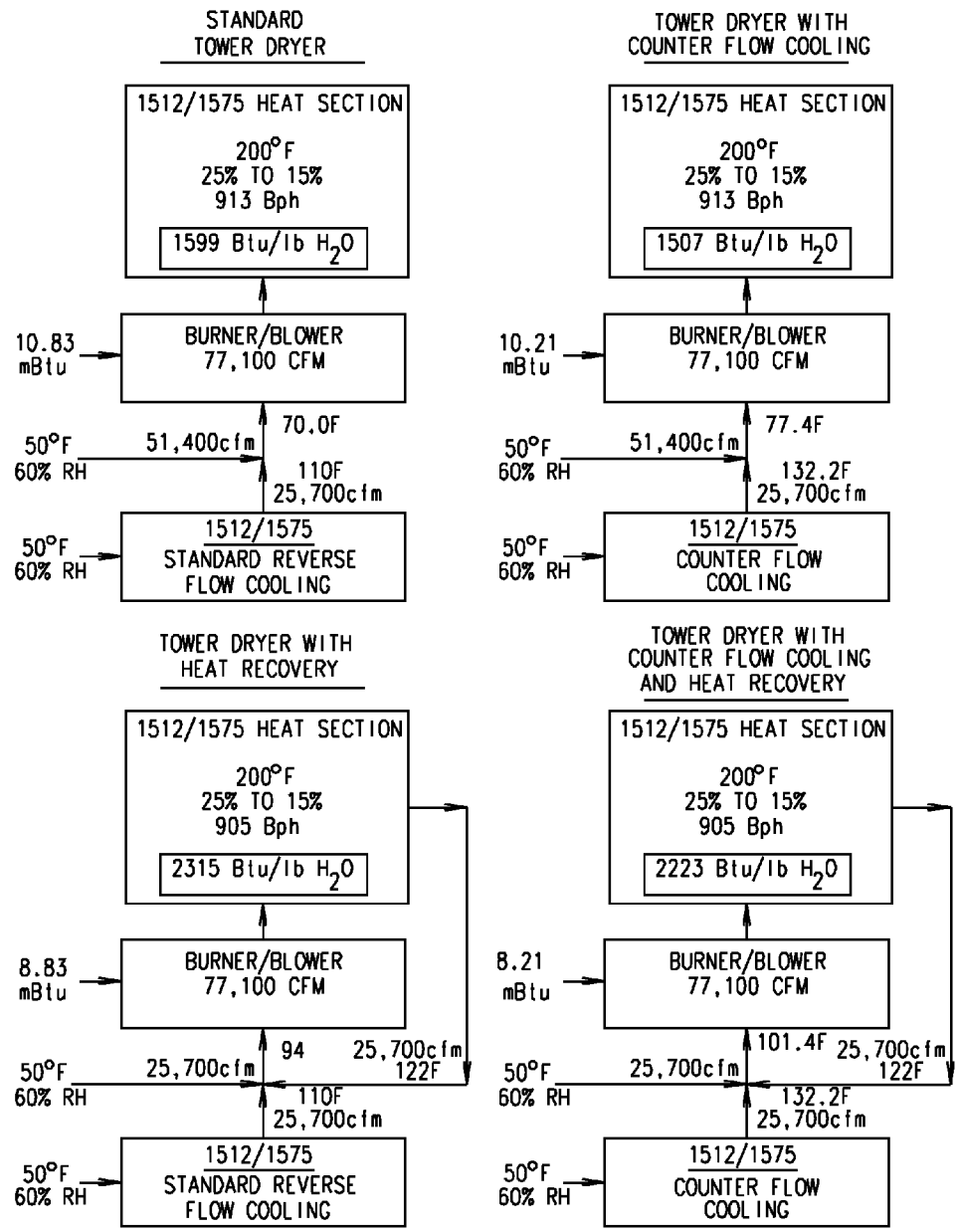
FIG. 19 is a schematic representation comparing the energy requirements of a prior art tower dryer (with cross-flow cooling), a tower dryer provided with just counter-flow cooling, a tower dryer provided with just heat recovery, and a tower dryer provided with both counter-flow cooling and heat recovery.

The diagram of FIG. 19 compares the energy requirements for a standard (or prior art) tower dryer (such as the tower dryer 10 with cross-flow cooling), a tower dryer with just counter-flow cooling, a tower dryer with just heat recovery, and a tower dryer with both counter-flow cooling and heat recovery. In the illustrative example, 10.83 mBTU were needed to heat 77,100 CFM of air to a desired drying temperature of 200° F. (~93° C.) based on an inlet air temperature of 70° F. (~21° C.). In the tower dryer with just counter flow cooling, the air entering the burner is calculated to be 77.4° F. (~25° C.) or about 7.4° F. (~4° C.) warmer than air from the prior art tower. This increase in the temperature of the air into the blower/burner assembly reduced the energy needed to heat the 77,100 CFM by 5.7% (to 10.21 mBTU). In the tower dryer with heat recovery, but not counterflow cooling, the air entering the burner is calculated to be 94° F. (~34° C.) or about 24° F. (~13° C.) warmer than the air entering the burner for the standard (prior art) tower dryer, and about 16.6° F. (~9° C.) warmer than the air entering the burner in the tower with counterflow cooling. The use of just heat recovery reduces the energy needed to heat the 77,100 CFM of air to 8.3 mBTU, representing a reduction of about 18% relative to the prior art tower dryer and about 13.5% relative to a tower dryer with just counterflow cooling. The use of both counter-flow cooling and heat recovery (by reclamation of warm, relatively dry exhaust air) raises the temperature of the air entering the blower/burner assembly, in the illustrative example, to 101.4° F. (~38.5° C.), and reduces the energy requirements for the tower dryer relative to the prior art tower dryer by 24.2% (to 8.21 mBTU). These calculations are provided for illustrative purpose only. These calculations are set forth in the table below:

|  | Standard (prior art) Tower Dryer | Tower Dryer with Counterflow cooling | Tower Dryer with Heat Recovery | Tower Dryer with both Counterflow cooling and Heat Recovery |
| --- | --- | --- | --- | --- |
| Temperature of input air entering the burner/blower | 70° F. ~21.1° C. | 77.4° F. ~25.2° C. | 94° F. ~34.4° C. | 101.4° F. ~38.6° C. |
| Energy needed to heat 77,100 CFM of input air to 200° F. | 10.83 mBTU | 10.21 mBTU | 8.83 mBTU | 8.21 mBTU |

The decrease in energy usage between the four tower dryers (the prior art cross-flow cooling, counter-flow cooling only, heat recovery only, and counter-flow cooling with heat recovery) will vary based on the ambient air temperature, the factors noted above which will affect the temperature of the exhaust air, as well as other factors. However, as can be appreciated, the use of just counter-flow cooling decreases the energy requirements slightly, the use of heat recovery reduces the energy requirements dramatically, and the use of both counter-flow cooling and heat recovery reduces the energy requirements even further.

As various changes could be made in the above constructions without departing from the scope of the invention, it is intended that all matter contained in the above description or shown in the accompanying drawings shall be interpreted as illustrative and not in a limiting sense. The heat recovery relies on moving warm dry exhaust air into the cooling section plenum. The tower dryers 100, 200 have the exhaust air reclamation path on the outside of the tower dryers. This is required in smaller diameter tower dryers, because of space requirements. However, in larger diameter tower dryers, the exhaust air reclamation path could be on the inside of the tower dryer (i.e., in the central plenum of the heating section). In such a tower dryer, the exhaust air reclamation path would pass from the cooling plenum through the plenum divider/divider hopper into the heating plenum and then turn through an elbow to a pass-through opening in the heating column, such that the inlet to the heat reclaim path is an opening in the exterior wall of the heating section and is in communication with the heat reclaim enclosure 150. Although the exit of the air reclamation path is preferably in the vicinity of the blower/dryer in the cooling section plenum, the exit from the air reclamation path into the cooling section central plenum could alternately be near the bottom of the tower. This would likely result in a longer vertical tube, and a taller enclosure (for systems wherein the vertical tube is on the outside of the tower dryer).

The invention claimed is:

1. A tower dryer for drying grain, the tower dryer comprising;
    an upper drying section comprised of an inner wall and an outer wall surrounding said inner wall; said inner and outer walls both being air permeable; said inner and outer walls, in combination, defining a grain drying flow path; said inner wall defining a heating section central plenum;
    a lower cooling section comprised of an inner wall and an outer wall surrounding said inner wall; said cooling section inner and outer walls, in combination, defining a grain cooling flow path which is in communication with, and receives grain from, said grain drying flow path; said inner wall defining a cooling section central plenum; said cooling section inner and outer walls being constructed to enable ambient air external of said tower dryer to be pulled into said cooling section central plenum;
    a blower and heater positioned between said cooling section central plenum and said drying section central plenum; said blower and heater being arranged to force heated air into said heating section central plenum;
    a heat recovery system comprising an enclosure to trap recyclable air and separate recyclable air from unusable exhaust air and/or ambient air and at least one exhaust air reclamation path having an entrance positioned to receive air that has passed through the outer wall of the upper drying section and into an area enclosed by the enclosure and an exit which is in communication with said cooling section central plenum, wherein said entrance comprises a duct placing the area enclosed by the enclosure in communication with a cooling plenum; whereby, said reclamation path directs heated exhaust air from said drying section, and reintroduces said heated exhaust air into said cooling section central plenum.

2. The tower dryer of claim 1 wherein said cooling section inner and outer walls are comprised of air permeable material.

3. The tower dryer of claim 1 wherein said cooling section inner and outer walls are comprised of air impermeable materials; said tower dryer comprising ducts extending through said grain cooling flow path to place said cooling section central plenum in communication with ambient external air.

4. The tower dryer of claim 3 wherein said ducts comprise a plurality of outer wall ducts extending into said grain cooling path from said cooling section outer wall and being open at said outer wall and a plurality of inner wall ducts extending into said grain cooling path from said cooling section inner wall and being open at said inner wall; said outer wall ducts and said inner wall ducts all being at least partially open at their bottoms; whereby cooling air enters said grain cooling path through an entrance into said outer wall ducts, travels up through downward flowing grain to enter said inner wall ducts, and enters the cooling section central plenum through an exit of said inner wall ducts.

5. The tower dryer of claim 4 wherein the enclosure has an open bottom and wherein the bottom of the enclosure is proximate the level of at least some of the outer wall ducts, whereby exhaust air can be pulled in through the outer wall ducts as cooling air.

6. A tower dryer for drying grain, the tower dryer comprising;
  an upper drying section comprised of an inner wall and an outer wall surrounding said inner wall; said inner and outer walls both being air permeable; said inner and outer walls, in combination, defining a grain drying flow path; said inner wall defining a heating section central plenum;
  a lower cooling section comprised of an inner wall and an outer wall surrounding said inner wall; said cooling section inner and outer walls, in combination, defining a grain cooling flow path which is communication with, and receives grain from, said grain drying flow path; said inner wall defining a cooling section central plenum; said cooling section inner and outer walls being constructed to enable ambient air external of said tower dryer to be pulled into said cooling section central plenum;
  a blower and heater positioned between said cooling section center plenum and said drying section center plenum; said blower and heater being arranged to force heated air into said heating section center plenum;
  a heat recovery system comprising at least one exhaust air reclamation path having an entrance positioned to receive air exiting the tower dryer through the drying section and an exit which is in communication with said cooling section central plenum; whereby, said reclamation path directs heated exhaust air from said drying section, and reintroduces said heated exhaust air into said cooling section central plenum;
  wherein said cooling section inner and outer walls are comprised of air impermeable materials; said tower dryer comprising ducts extending through said grain cooling flow path to place said cooling section central plenum in communication with ambient external air;
  wherein said ducts comprise a plurality of outer wall ducts extending into said grain cooling path from said cooling section outer wall and being open at said outer wall and a plurality of inner wall ducts extending into said grain cooling path from said cooling section inner wall and being open at said inner wall; said outer wall ducts and said inner wall ducts all being at least partially open at their bottoms;
  whereby cooling air enters said grain cooling path through an entrance into said outer wall ducts, travels up through downward flowing grain to enter said inner wall ducts, and enters the cooling section central plenum through an exit of said inner wall ducts.

7. The tower dryer of claim 6 wherein said inner wall ducts and said outer wall ducts have sloped upper surfaces defining an angle to the vertical less than the angle of repose for the grain passing through the column.

8. The tower dryer of claim 7 wherein upper surfaces of said inner wall ducts and said outer wall ducts define an inverted V.

9. The tower dryer of claim 8 wherein said inner wall ducts are generally in the shape of an inverted V or are generally diamond shaped.

10. The tower dryer of claim 8 wherein said outer wall ducts are generally in the shape of an inverted V or are generally diamond shaped.

11. The tower dryer of claim 8 wherein either or both of said inner wall ducts and said outer wall ducts comprise a bottom surface that is either perforated or louvered.

12. The tower dryer of claim 6 wherein the heat recovery system includes an enclosure to trap recyclable air and separate recyclable air from unusable exhaust air and/or ambient air.

13. The tower dryer of claim 12 wherein an at least one reclamation path comprises a duct placing the enclosure in communication with a cooling plenum.

14. The tower dryer of claim 12 wherein the enclosure has an open bottom and wherein the bottom of the enclosure is proximate the level of at least some of the outer wall ducts, whereby exhaust air can be pulled in through the outer wall ducts as cooling air.

* * * * *